United States Patent

Heucher et al.

[11] Patent Number: 5,883,172
[45] Date of Patent: Mar. 16, 1999

[54] POLYAMIDE HOTMELT ADHESIVE

[75] Inventors: Reimar Heucher, Pulheim; Siegfried Kopannia, Krefeld; Ulrike Maassen, Neuss, all of Germany

[73] Assignee: Henkel Kommanditgesellschaft auf Aktien, Duesseldorf, Germany

[21] Appl. No.: 939,425

[22] Filed: Sep. 29, 1997

Related U.S. Application Data

[63] Continuation of Ser. No. 700,459, Sep. 10, 1996, abandoned.

[30] Foreign Application Priority Data

Mar. 11, 1994 [DE] Germany .......................... 44 08 277.0

[51] Int. Cl.[6] .............................. C08K 3/26; C08L 77/08
[52] U.S. Cl. .......................... 524/425; 524/436; 524/514; 524/555; 524/607; 524/608; 525/432; 428/355; 427/208.2
[58] Field of Search ................... 524/425, 436, 524/514, 555, 607, 608; 525/432; 428/355; 427/208.2

[56] References Cited

U.S. PATENT DOCUMENTS

| | | | |
|---|---|---|---|
| 4,409,373 | 10/1983 | Wiemers et al. | 524/514 |
| 4,912,196 | 3/1990 | Leoni et al. | 528/338 |
| 5,548,027 | 8/1996 | Heucher et al. | 524/505 |

FOREIGN PATENT DOCUMENTS

| | | |
|---|---|---|
| 1 411 568 | 8/1965 | France . |
| 2253812 | 4/1975 | France . |
| 2 361 486 | 6/1975 | Germany . |
| 25 52 518 | 8/1976 | Germany . |
| 42 11 125 | 10/1993 | Germany . |
| 55-063 223 | 5/1980 | Japan . |
| 57-053 579 | 3/1982 | Japan . |
| WO 93/20166 | 10/1993 | WIPO . |

OTHER PUBLICATIONS

Journal of the American Oil Chem. Soc. 41 (1964) pp. 723–727.

Primary Examiner—James J. Seidleck
Assistant Examiner—Olga Asinovsky
Attorney, Agent, or Firm—Ernest G. Szoke; Wayne C. Jaeschke; Martin G. Meder

[57] ABSTRACT

A composition of matter useful as a hotmelt adhesive is provided. The composition is comprised of a polyamide based on dimerized fatty acid and having an amine value higher by at least two units than the acid value of said polyamide and a filler comprised of a carbonate. The filler is preferably comprised of fine particles of calcium carbonate. The adhesive is particularly useful for bonding metals, e.g. to plastics and the bonding of cables with multilayer sheaths, e.g. in optical cables and power cables.

20 Claims, No Drawings

POLYAMIDE HOTMELT ADHESIVE

This application is a continuation of application Ser. No. 08/700,459 filed on Sep. 10, 1996 now abandoned.

BACKGROUND OF THE INVENTION

1. Field of the Invention

This invention relates to a polyamide hotmelt adhesive containing fillers and to its use.

2. Discussion of Related Art

Polyamide hotmelt adhesives containing fillers are known. Thus, DE 23 61 486 describes a hotmelt adhesive consisting of a polyamide resin and 5 to 80% by weight of an inorganic filler. The polyamide resin is produced from 0.5 to 0.8 equivalent of a polymeric fatty acid, 0.2 to 0.5 equivalent of another dicarboxylic acid, 0 to 0.6 equivalent of ethylenediamine and 0.4 to 1.0 equivalent of piperazine, the equivalent ratios between the dicarboxylic acids and the diamines being substantially the same. The five Examples only describe polyamides of which the acid value is greater than the amine value by at least 2 units. Chalk and heavy spar are mentioned as inorganic fillers (cf. the Examples and page 2, paragraph 4). The polyamide hotmelt adhesive is said to be used as an edge-banding glue for heat-resistant edge glueing. The edge veneer materials mentioned include veneers of wood, melamine/formaldehyde or urea/formaldehyde resins, polyesters and also polyvinyl chloride and polyacrylonitrile/butadiene/styrene. These edge veneer materials are bonded to furniture boards.

Polyamide hotmelt adhesives containing fillers are also known from Schering AG's pamphlet on "Eurelon". Among the 15 types mentioned, there is one of which the amine value is higher than acid value. All the other types either have substantially the same values or a higher acid value. Inorganic fillers, such as chalk, heavy spar, kaolin or aluminium oxide, may be added to these polyamide resins in their molten form. In view of the relatively low melt viscosity of some of the resins, preference should be given to light fillers with little or no tendency to sediment in order as far as possible to avoid sedimentation of the filler during application of the hotmelt adhesive. The incorporation of fillers is recommended if, in the bonding of porous materials, an overly thin adhesive penetrates into the substrate to such an extent that the actual glueline consists solely of a paper-thin film. Not only do the surfaces to be bonded have to be degreased, it is also necessary in most cases, for example in the case of metals, to remove troublesome oxide or scale layers by mechanical roughening or pickling or, in the case of plastics with non-polar surfaces, to convert these surfaces into a polar state by a chemical pretreatment. The following materials may be bonded: aluminium and aluminium alloys, steel and stainless steel, magnesium and magnesium alloys, ceramic materials, glass and china, concrete and asbestos cement, polyethylene, polypropylene, polyamides, foams, leather and rubber, natural and synthetic rubber and various materials, such as thermosets, rigid PVC, polystyrene, polyacrylates, polycarbonates and polyacetates. The hotmelt adhesives are used not only in the shoe industry, the furniture industry, the automotive industry and the packaging industry, but also in the electrical industry, inter alia for bonding coil ends and coil windings, in the bonding of housings and in the application of ornamental trims, etc.

DE 42 11 125 describes polyamide hotmelt adhesives which may contain 0.5 to 2% by weight of fillers. Particulars of the type of fillers used are not provided. The polyamides may be both acid-terminated and amine-terminated. Amine-terminated polyamides are used in the Examples. The hotmelt adhesives are used to bond non-pretreated polyethylene and polyvinyl chloride or metals, more particularly copper, lead and aluminium, to one another or to themselves. Specific applications are in the electrical industry, more particularly for bonding cables and lines.

SUMMARY OF THE INVENTION

The problem addressed by the present invention was to improve the strengths of the metal-to-metal bonds in the electrical industry.

The solution provided by the invention is defined in the claims and lies essentially in the choice of two components: the polyamide should have a higher amine value than acid value and the filler used should be a carbonate.

DETAILED DESCRIPTION OF THE INVENTION

The hotmelt adhesive according to the invention contains a polyamide based on dimerized fatty acid as its key component. "Dimerized fatty acids" are obtained by coupling unsaturated long-chain monobasic fatty acids, for example linolenic acid, oleic acid. It is a mixture of several isomers (cf. R. F. Paschke, L. E. Peterson and D. H. Wheeler, *Journal of the American Oil Chemists' Society*, 41, 723 (1964). Trimers and other oligomers may of course also be present in small amounts. The acids have been known for some time and are commercially available.

The polyamides according to the invention preferably have the following composition:

35 to 49.5 mole-% of dimerized fatty acid and 0.5 to 15 mole-% of monomeric $C_{12-22}$ fatty acid, 2 to 35 mole-% of polyether diamines corresponding to the following general formula:

$$H_2N-R_1-O-(R_2O)_x-R_3-NH_2 \qquad (I)$$

in which x is a number of 8 to 80, mainly 8 to 40, $R_1$ and $R_2$ may be the same or different and represent aliphatic and/or cycloaliphatic hydrocarbon radicals preferably containing 2 to 8 carbon atoms, $R_3$ is an optionally branched aliphatic hydrocarbon radical containing 1 to 6 carbon atoms, and 15 to 48 mole-% of aliphatic $C_{2-40}$ diamines, up to two thirds of the dimerized fatty acids being replaceable by aliphatic $C_{4-12}$ dicarboxylic acids.

However, it is also favorable to use a polyamide obtained from:

20 to 49.5 mole-% of dimerized fatty acid and 0.5 to 15 mole-% of monomeric $C_{12-22}$ fatty acid and 20 to 55 mole-% of a $C_{2-40}$ amine containing at least two primary amino groups, up to two thirds of the dimerized fatty acids being replaceable by aliphatic dicarboxylic acids containing 4 to 12 carbon atoms.

In addition, the polyamides used in accordance with the invention may contain other raw materials typically encountered in hotmelt adhesives. Thus, aliphatic dicarboxylic acids in particular are typical raw materials. Suitable aliphatic carboxylic acids preferably contain 4 to 12 carbon atoms. For example, glutaric acid, maleic acid, succinic acid, adipic acid, pimelic acid, suberic acid and even sebacic acid are suitable. In molar terms, up to two thirds of these acids may be replaced by dimer fatty acid. It is known to the expert in this regard that the melting points of polyamides can be increased to a certain extent by addition of sebacic acid. Other possible raw materials for hotmelt adhesives are long-chain aminocarboxylic acids, such as 11-aminoundecanoic acid, or even lauryl lactam. The polyamide raw materials known in fiber chemistry, such as caprolactam for example, may also be used in small quantities. These substances enable the expert to increase the melting point within certain limits.

So far as the amine components in the polyamides are concerned, polyether polyols terminated by primary amino groups are preferred. Suitable amino-terminated polyether polyols are based on polyethylene glycol, polypropylene glycol or polytetrahydrofuran. Amino-terminated polyether polyols which are insoluble or only sparingly soluble in water are preferred. The amino-terminated polyether polyols used have molecular weights of 700 to 3,500 or even in the range from 1,200 from 2,500. A particularly suitable class of raw materials are, for example, the bis-(3-aminopropyl)-polytetra-hydrofurans with a molecular weight of 700 to 3,500 or the bis-(2-aminopropyl)-polyoxypropylenes with a molecular weight of 1,200 to 2,500. Linear $C_{2-10}$ alkylene diamines, for example hexamethylenediamine, 1,3-diaminopropane, 1,4-diaminobutane, may also be used. Piperazine and dipiperidyl propane are also suitable. Another suitable class of diamines is derived from the dimer fatty acids and contains primary amino groups instead of the carboxyl groups. Such substances are often called dimer diamines. They are obtained by nitrile formation from the dimerized fatty acids and subsequent hydrogenation.

The following observations are made regarding the molecular structure of the polyamides on which the compatible mixtures according to the invention are based: it is known to the expert active in this field that monofunctional, difunctional and trifunctional raw materials are used in a certain ratio to obtained fusible, i.e. non-crosslinked, products. General knowledge of polymer chemistry is relevant in this regard. Accordingly, in the event of crosslinking/gelation, the tendency towards gelation can be eliminated by reducing the content of trifunctional components (trimer fatty acids) and/or by increasing the content of monofunctional amines or fatty acids. The molecular weight of the hotmelt adhesives according to the invention can best be calculated by GPC.

The hotmelt adhesives according to the invention mainly contain terminal amino groups. Their amine values are generally between 2 and 15 and preferably between 4 and 10. Their amine values are preferably higher than their acid values by 2 and, more particularly, 4 units.

The amine value is defined as the quantity of KOH in mg which is equivalent to 1 g of the substance. It is determined in accordance with DIN 16945, page 1, under the following conditions: around 2.5 to 6 g of the polyamide hotmelt adhesive to be investigated are carefully weighed into an Erlenmeyer flask and 100 ml of a cold mixture of toluene/n-butanol (equal parts by volume) are added. The sample is then dissolved by heating. After cooling, 50 ml of ethanol and 3 ml of bromcresol green are added. Titration is carried out with a 0.5N hydrochloric acid.

The acid value is defined as the quantity of KOH in mg which is required to neutralize 1 g of the substance. It is determined as follows in accordance with DIN 53402: around 2.5 to 6 g are carefully weighed into an Erlenmeyer flask and dissolved in 100 ml of a neutralized mixture of toluene/n-butanol (equal parts by volume) by heating. After the solution has cooled, 50 ml of ethanol and phenolphthalein as indicator are added. Titration is carried out with a 0.5N potassium hydroxide.

Fillers are generally used to increase volume and/or weight. In the present case, the same also applies to the hotmelt adhesive. In addition, however, technical performance is also improved, above all by increasing the strength levels. The fillers according to the invention are carbonates, i.e. salts derived from carbonic acid, more especially calcium carbonate. However, carbonates of other metals, for example magnesium and aluminium, may also be used. Specific examples of carbonates are chalk, magnesium hydroxocarbonate, hydrotalcite (dialuminium hexamagnesium carbonate hexadecahydroxide). The fillers are preferably coated, for example with around 2% by weight of calcium stearate or carboxylated polybutadiene. The primary particle size of the fillers is in the range from 50 to 0.05 μm and preferably in the range from 0.1 to 0.06 μm and is determined by the air permeation technique.

To this end, the time taken by a certain amount of air under a certain pressure to pass a through a tablet with a certain diameter and a certain thickness is measured, the tablet having been produced from the material to be investigated under a certain pressure. Comparison with the permeation times of substances with known particle diameters provides information on the particle diameter of the substance to be investigated. The carbonates are added in a quantity of up to 70% by weight, preferably in a quantity of 5 to 50% by weight and more preferably in a quantity of 20 to 40% by weight, based on the polyamide hotmelt adhesive as a whole.

Besides these two key components, namely the amine-terminated polyamide and the carbonate, the hotmelt adhesives may optionally contain other components, more particularly other polymers, such as ethylene/vinyl acetate copolymers, tackifying resins, plasticizers, fillers such as, for example, hollow microbeads of glass or plastics, stabilizers, antioxidants, pigments, preservatives and fungicides.

Up to 40% of the polyamide may be replaced by the additional polymer, for example the ethylene/vinyl acetate copolymer. The additives are incorporated in a quantity of 0.1 to 5.0% by weight and preferably in a quantity of 0.2 to 1.5% by weight, based on the hotmelt adhesive as a whole. Accordingly, the polyamide hotmelt adhesive preferably has the following composition:

a) 30 to 95% and, more particularly, 60 to 80% of polyamide which may be partly replaced by other polymers, b) 5 to 70% and, more particularly, 20 to 40% of carbonate and c) 0.1 to 5.0% and, more particularly, 0.2 to 1.5% of other additives.

The hotmelt adhesives according to the invention may be produced in known manner. Thus, the carbonates may be incorporated in polyamide hotmelt adhesives using heatable kneaders or extruders. Normally, the following procedure is adopted: the hotmelt adhesive is melted at 160° to 180° C. and the filler is added to the melt in small portions with stirring. After the melt and the filler have been homogenized, the stabilizer, for example Irganox 1010, is added and likewise homogenized. A vacuum is best applied before the end product is discharged. The end product has a density of around 1.3 g/cm$^3$.

In order to determine the maximum mixing temperature, it is advisable to ascertain by DSC measurements the temperature beyond which the carbonate decomposes or melts. For Hydrotalcit C 300, this temperature is at around 210° C.; for the carbonate known as Winnofil, it is higher. To avoid discoloration at these high temperatures, a stabilizer, for example Irganox 1010, should be added. Another important parameter in this regard is the process temperature of the polyamides.

The hotmelt adhesives according to the invention are stable in storage, even in their molten form. Thus, very little filler sediments when the hotmelt adhesive is stored for 60 hours at 170° C.

Although the addition of the carbonates involves an increase in viscosity, the hotmelt adhesives according to the invention may be applied virtually as usual. For example, bonding may be carried out in accordance with DIN 53282 and DIN 53539.

The hotmelt adhesives according to the invention lead to relatively high peel strengths on metals and to greater resistance to petroleum jelly. Another advantage is their more favorable, i.e. lower, permeability to water vapor by comparison with unfilled polyamide.

By virtue of these positive properties, the hotmelt adhesives according to the invention are particularly suitable for bonding metals to one another and to plastics, more particularly to polyolefins and polyesters. They may be widely used in the electrical industry, particularly in the bonding of cables with multilayer sheaths. Specific applications include optical cables and power cables.

The invention is illustrated by the following Examples.

EXAMPLES

A) Polyamides used a) Macromelt 6797 (Henkel KGaA): an amine-terminated polyamide hotmelt adhesive based on dimer fatty acid with an amine value of at most 10.0 and an acid value of at most 3.0.

b) Macromelt 6239 (Henkel KGaA): an amine-terminated polyamide hotmelt adhesive based on dimer fatty acid with an amine value of 5.0 to 10.0 and an acid value of at most 2.0.

c) Macromelt 22–247 (Henkel KGaA): an amine-terminated polyamide hotmelt adhesive based on dimer fatty acid with an amine value of 5.0 to 10.0 and an acid value of at most 1.0.

d) Macromelt 6735 (Henkel KGaA): a polyamide hotmelt adhesive based on dimer fatty acid with an amine value of 4.0 to 10.0 and an acid value of at most 2.0.

e) Macromelt 6238 (Henkel KGaA): an acid-terminated polyamide hotmelt adhesive based on dimer fatty acid with an amine value of at most 2.0 and an acid value of 6.0 to 12.0.

B) Fillers used a) Winnofil SPTB: stearate-coated $CaCO_3$ (ICI Resins), b) Hydrotalcit C 300: basic Mg-Al carbonate (Giulini), c) Fortimax "M", now Winnofil FXM: $CaCO_3$ coated with carbox. polybutadiene (ICI Resins), d) Omyacarb 4 BG: chalk (Omya GmbH), e) Socal U1R: chalk (Solvay).

C) Production of the modified hotmelt adhesives

The adhesives for the tests were all produced in a thermoblock at around 180° to 200° C. The polyamide was introduced first and the filler slowly added. Mixing lasted about 0.5 to 2.0 hours. The modified hotmelt adhesives have a light brown caramel-like appearance.

D) Bonding 0.2 mm thick copper foils and 0.3 mm thick aluminium foils were used as the substrates. The substrate surfaces were carefully cleaned with isopropanol. The adhesive was applied in a layer thickness of around 0.4 to 0.7 mm. The substrates were bonded for 2 minutes at 200° C. under a maximum pressure of 10 bar.

E) Measurements

After storage for at least 24 hours at around 25° C./60% relative air humidity, the samples were tested as follows:

a) Softening point in ° C. according to ASTM E 28.

b) Peel strength in N/cm according to DIN 53282 and DIN 53539, method C.

c) Density in $g/cm^3$ according to ASTM D 792.

d) Resistance to petroleum jelly in % according to DIN 57472/VDE 0472.

e) Spot test: in this test, the hotmelt adhesive is applied to a substrate and removed again by hand after 24 hours. The force required is subjectively evaluated by scoring on a scale of 0 to 15 (0=inadequate low force, 15=very high force).

In addition, f) melt viscosity was determined in mPas at 180° C. and 200° C. in accordance with ASTM D 3236.

F) Results a) Composition and results obtained with various fillers

| Test No. | 1 | 2 | 3 | 4 | 5 | 6 | 6b |
|---|---|---|---|---|---|---|---|
| Macromelt 6735, % | 100 | 60 | 90 | 80 | 90 | 80 | 90 |
| Socal U1R | — | — | — | — | — | — | 10 |
| Omyacarb 4 BG, % | — | 40 | — | — | — | — | — |
| Winnofil SPTB, % | — | — | 10 | 20 | — | — | — |
| Hydrotalcit C 300, % | — | — | — | — | 10 | 20 | — |
| Softening point, °C. | 100.8 | 104.4 | 106.5 | 112.1 | 107.4 | 114.2 | 101.8 |
| Density, $g/cm^2$ | ca. 1 | 1.279 | — | — | — | — | 1.02 |
| Melt viscosity, mPa · s | | | | | | | |
| 180° C. | 21000 | 29000 | 38000 | 78750 | 47000 | 68750 | 37250 |
| 200° C. | 8500 | 14750 | 19000 | 45000 | 18500 | 31250 | 9150 |
| Resistance to petroleum jelly, % | 3.7 | 2.8 | — | — | — | — | — |
| Spot test | | | | | | | |
| Al | 2 | — | 3 | 3 | 3 | 5 | — |
| Peel strength, N/cm | | | | | | | |
| Al | 4.6 | 13.8 | — | — | — | — | — |
| Cu | 20.6 | 42.8 | 53.7A/C | — | 61.5A/C | 19.1A | 54.8 A |

A = Adhesion fracture pattern
K = Cohesion fracture pattern
A/C = Adhesion and cohesion fracture pattern the tests reflect a significant improvement in strength (spot test and peel strength), in resistance to petroleum jelly and in softening point. Density and melt viscosity were increased.

b) Composition and results obtained by addition of a filler and a plasticizer

| Test No. | 7 | 8 | 9 | 10 |
|---|---|---|---|---|
| Macromelt 6735, % | 90 | 80 | 85 | 70 |
| Ketjenflex 8[1], % | — | — | 5 | — |
| Fortimax "M" % | 10 | 20 | 10 | 30 |
| Softening point, °C. | 105.4 | 108.4 | 92.8 | 98.1 |
|  |  |  | 98.7 | 114.5 |
| Melt viscosity, mPas |  |  |  |  |
| 180° C. | 27000 | 44000 | 19700 | 105333 |
| 200° C. | 13000 | 20550 | — | 49200 |
| Spot test |  |  |  |  |
| Cu | 15 | 14 | 14 | 13 |
| Peel strength, N/cm |  |  |  |  |
| Cu | 63.5A/C | 83.5A/C | 30.7A | — |
| Al | — | 11.6 A | — | — |

[1]Ketjenflex 8 is a plasticizer based on p-toluene sulfonic acid amide available from AKZO AG.

The effects of adding a filler are confirmed (compare tests 7 to 10 with test 1). The plasticizer reduces melt viscosity.

c) Composition and results obtained with various amine-terminated polyamides

| Test No. | 11 | 12 | 13 | 14 | 15 | 16 |
|---|---|---|---|---|---|---|
| Macromelt 6239, % | 80 | 100 | — | — | — | — |
| Macromelt 22-247, % | — | — | 80 | 100 | — | — |
| Macromelt 6797, % | — | — | — | — | 80 | 100 |
| Fortimax "M", % | 20 | — | 20 | — | 20 | — |
| Melt viscosity, mPas |  |  |  |  |  |  |
| 180° C. | — | — | — | — | 11775 | 4267 |
| 190° C. | 77500 | 26250 | 62500 | 21000 | — | — |
| Spot test |  |  |  |  |  |  |
| Cu | 12 | 8 | 11 | 8 | 15 | 10 |
| PE | 5 | 2 | 2 | 1 | 0 | 0 |
| Peel strength, N/cm |  |  |  |  |  |  |
| Cu | 31.7A | 26.7A | 36.0A | 17.2A | 82.9C | 60.8C |

All amine-terminated PA hotmelt adhesives show improvements in strength and an increase in viscosity where the filler is added.

d) Composition and results obtained by addition of fillers (chalk) to acid-terminated and amine-terminated PA hotmelt adhesives

| Test No. | 17 | 18 | 19 | 20 |
|---|---|---|---|---|
| Macromelt 6735, % | 60 | 100 | — | — |
| Macromelt 6238, %- | — | — | 100 | 60 |
| Omyacarb 4 BG, % | 40 | — | — | 40 |
| Softening point, °C. | 104.4 | 100.8 | 138.3 | 139.9 |
| Viscosity (mPas): |  |  |  |  |
| 180° C. | 29000 | 21150 | 7967 | 21750 |
| 200° C. | 14750 | 8550 | 3800 | 11250 |
| Peel strengths, (N/cm) |  |  |  |  |
| Cu | 42.8A/C | 20.6A | 38.3A/C | 13.5A |

Amine-terminated PA hotmelt adhesives show an improvement in strength whereas acid-terminated PA hotmelt adhesives show a deterioration in strength.

What is claimed is:

1. A composition of matter useful as a hotmelt adhesive comprising a polyamide based on dimerized fatty acid and having an amine value higher by at least two units than the acid value of said polyamide and filler consisting essentially of a carbonate, wherein said composition has a peel strength to copper of at least about 30.7 N/cm.

2. The composition of claim 1 comprised of 30% to 90% by weight of said polyamide and 5% to 70% by weight of said filler based on the polyamide hotmelt adhesive as a whole.

3. A composition comprised of 60% to 80% by weight of a polyamide based on dimerized fatty acid and having an amine value higher by at least two units than the acid value of said polyamide and 20% to 40% by weight of a filler based on the polyamide hotmelt adhesive as a whole, wherein said filler consisting essentially of a carbonate.

4. The composition of claim 1 wherein said composition consists of:
a) 30 to 95% of said polyamide,
b) 5 to 70% of said filler, and
c) 0.1 to 5% of other additives.

5. A composition wherein said composition consists of:
a) 60 to 80% of a polyamide based on dimerized fatty acid and having an amine value higher by at least two units than the acid value of said polyamide,
b) 20 to 40% of a filler consisting essentially of a carbonate, and
c) 0.2 to 1.5% of other additives.

6. The composition of claim 1 further comprised of an additive selected from the group consisting of polymers other than said polyamide, tackifying resins, plasticizers, fillers other than said filler comprised of a carbonate, stabilizers, antioxidants, pigments, preservatives and fungicides.

7. The composition claimed in claim 1 wherein said filler is calcium carbonate.

8. The composition claimed in claim 1 wherein said filler is coated calcium carbonate.

9. The composition claimed in claim 1 wherein said filler has fine particles.

10. The composition claimed in claim 1 wherein said filler has a particle size of 0.05 to 50 $\mu$m.

11. The composition claimed in claim 1 wherein the amine value of said polyamide is higher by at least four units than the acid value of said polyamide.

12. A composition of matter useful as a hotmelt adhesive comprising 60 to 80% of a polyamide based on dimerized fatty acid and having an amine value higher by at least four units than the acid value of said polyamide and 20 to 40% of a filler base on the polyamide hotmelt adhesive as a whole, wherein said filler consisting essentially of a calcium carbonate having a particle size of 0.05 to 50 $\mu$m.

13. In a method of bonding metals, the improvement comprising using as an adhesive, the composition claimed in claim 1.

14. The method of claim 13 wherein said metals are selected from the group consisting of copper-containing metals and aluminum-containing metals.

15. The method of claim 13 wherein said metals are bonded to a plastic.

16. The method of claim 15 wherein said plastic is selected from the group consisting of polyolefins, polyesters and polyvinyl chloride.

17. In a method of bonding metals, the improvement comprising using as an adhesive, the composition claimed in claim 12.

18. In a method of bonding of cables with multilayer sheaths, the improvement comprising using as an adhesive, the composition claimed in claim 1.

19. The method of claim 18 wherein said cables are selected from the group consisting of optical cables and power cables.

20. In a method of the bonding of cables with multilayer sheaths, the improvement comprising using as an adhesive, the composition claimed in claim 12.

* * * * *